March 12, 1968  W. H. GRAVERT  3,372,592
SINGLE-WIRE MECHANICAL WAVE DEPTH GAUGE
Filed Aug. 22, 1966
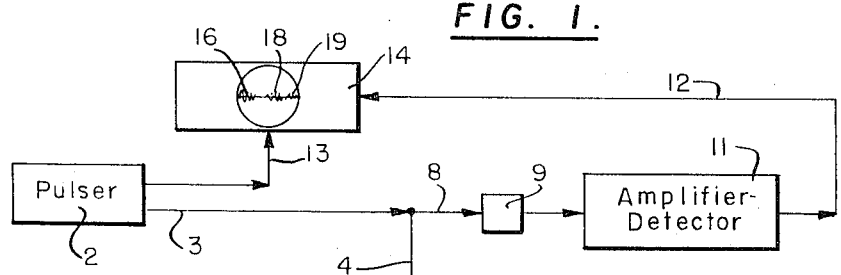
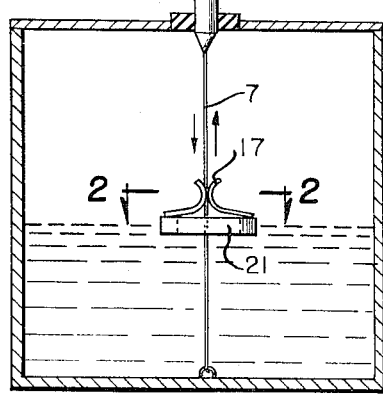
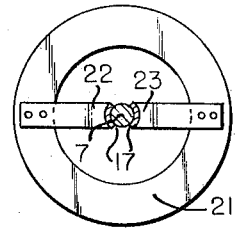
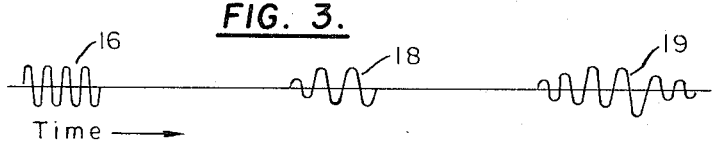
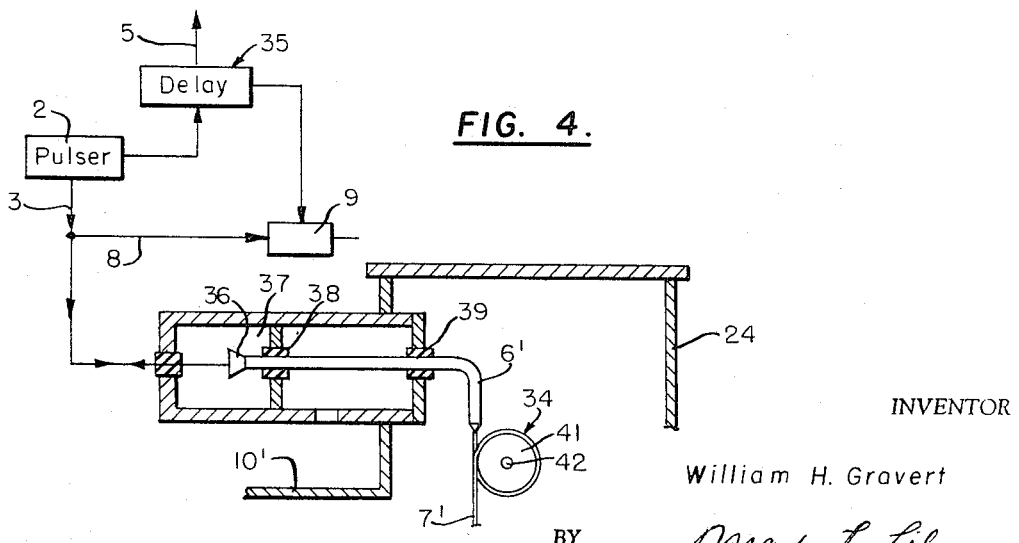
INVENTOR
William H. Gravert
BY Max L. Libman
ATTORNEY

United States Patent Office 3,372,592
Patented Mar. 12, 1968

3,372,592
SINGLE-WIRE MECHANICAL WAVE
DEPTH GAUGE
William H. Gravert, Port Washington, N.Y., assignor to
Marine Moisture Control Company, Inc., Inwood, N.Y.,
a corporation of New York
Filed Aug. 22, 1966, Ser. No. 573,994
8 Claims. (Cl. 73—313)

This invention relates to the measurement of liquid level in a container, more specifically to a system for the determination of liquid level in a closed container such as a tank. The invention is particularly adapted for, but not limited to, measurement of highly inflammable fluid such as gasoline in large tanks, both stationary and marine tanks.

Due to the highly inflammable nature of liquid fuels, it is highly desirable to eliminate any possibility of electric sparks within the tank, or to insert within the tank any equipment which might tend to increase the fire or explosion hazard. For this reason, it is highly undesirable to use electrical measuring equipment or any electrical wiring within the tank, and in many situations the use of such equipment is forbidden. Various attempts have been made to use mechanical wave energy for this purpose, as examplified by the patent to Kalmus et al., No. 3,208,281, which uses two vertical wires, together with a float which bridges these wires at a point corresponding to the liquid level; the time of transmission of a mechanical wave or impulse down one wire to the surface of the liquid and back to the other wire is then measured as an indication of the depth. However, this equipment has been found to have a serious drawback, especially for use in large tanks in ships, and also in stationary situations where it is necessary to periodically clean the tank down in such manner as to produce liquid turbulence in the tank. Such liquid turbulence tends to cause the bridging float at the surface of the liquid to rotate, thus twisting the two wires, and destroying the operability of the device. It is a major object of the present invention to overcome the above-mentioned difficulty, and also at the same time provide a simpler equipment, in which only a single wire is used.

In accordance with the present invention, the impulse is sent down the single wire to a wire-contacting element carried by a float at a point corresponding to the liquid level; the presence of the wire-contacting element at this point causes a reflection to be returned along the same wire, and the time elapsing from the production of the transmitted pulse to the reception of the reflected pulse is, of course, an indication of the depth of the liquid in the tank. Suitable electrical circuitry for measuring this time interval is well known, and may in fact be very similar to the measuring circuitry of the above-mentioned Patent No. 3,208,281, except that it is arranged to respond to the first reflected pulse back along the same wire, rather than to the first round-trip pulse in a two-wire path. This time interval may be expressed either digitally, by well-known means, or may be displayed on an oscilloscope or on a suitable meter by means well-known in the art.

The specific nature of my invention, as well as other objects and advantages thereof, will clearly appear from a description of a preferred embodiment as shown in the accompanying drawing, in which:

FIG. 1 is a schematic diagram showing the principle of the invention;

FIG. 2 is an enlarged sectional view taken on line 2—2 of FIG. 1;

FIG. 3 is a pulse-time chart showing the time relationship of the various pulses employed in the system; and FIG. 4 is a sectional view showing a practical embodiment of the invention.

Referring to FIG. 1, an electrical pulser 2, which may be of any conventional design, is employed to produce signals on a line 3 at a suitable repetition rate, for example, 10 per second. Each of these signals is transmitted to line 4, to excite transducer 6, where the pulse signals are transmitted to corresponding mechanical vibrations of the same time duration and thence to single wire 7, as will be explained in more detail below. The pulse on line 3 is also transmitted on branch line 8 to a gating device 9, which is opened thereby for a suitable period, say 1/15 of a second, and during the period when it is opened, further pulses can be transmitted through line 8 to receiver-detector system 11, where they are suitably amplified and detected to produce a sharp pulse on line 12. At the same time that the initial pulse is produced on line 3, a similar pulse is transmitted on line 13 to oscilloscope 14 to produce the starting pulse 16 and to initiate the sweep circuit of the oscilloscope.

The mechanical pulse produced by transducer 6 is transmitted down wire 7 to the line-contacting reflector elements 17, the presence of which causes a reflected pulse to return up the line 7 and ultimately to produce an electrical pulse at transducer 6 which then is conducted by wire 4 in the opposite direction from the initial pulse, to line 8, and thence through the open gate 9 to the unit 11 as previously described. The time of arrival of this pulse is shown at 18 on the oscilloscope, and the distance between pulses 16 and 18 in the oscilloscope is a measure of the liquid level, since practically all of the time duration involved is taken up by the travel time of the mechanical pulses in wire 7, at the rate of about 10,000 feet per second, while the electrical pulses travel at speeds very many times higher, so that the travel time in the electrical circuit is entirely negligible in comparison with the travel time in the wire 7. Of course, only a portion of the pulse travelling down wire 7 is reflected at 17, and the rest continues down the wire 7 to the bottom of the tank, where it is reflected from the end of the wire and finally appears on the oscilloscope as indicated at 19; however, this indication is disregarded, since it is constant and has no relation to the depth of liquid in the tank. It will be obvious that the two pulses 16 and 18 may also be used to trigger a counter as described in Patent No. 3,208,281, whereby a digital indication of the elapsed time interval may be obtained.

The reflecting unit 17 may be made in a number of ways, the important thing being to provide a discontinuity in the mass of the wire which will produce the desired reflection. As shown in FIG. 2, this may be accomplished by having the float 21 carry two metallic spring elements 22 and 23 which are pressed together on opposite sides of the wire. A rather light pressure is sufficient for the purpose, it being necessary only to have sufficient pressure to produce a sonic wave-conducting discontinuity at this point. It is well-known that any change in the effective diameter of the wire 7 will tend to produce a reflection of a sonic wave travelling down the wire. Instead of the spring-pressed element 17, two metal rollers may be employed which are pressed to each other, or any other suitable metal-contacting arrangement carried by the float will serve the purpose.

As shown in FIG. 3, the initial pulse is preferably a burst of high-frequency pulses, for example at 100 kc. This high frequency is desirable in order to produce a very sharp leading edge, which assists in providing a clean-cut definition of the transmitted and received waves. At the same time, it permits a tuned amplifier circuit to be used to both provide the required amplification, and also to eliminate mechanical and electrical effects at all other frequencies, thus reducing the effect of extraneous mechanical shocks and vibrations, and so forth.

It will be apparent that since only a single wire is used, there is no possibility of any twisting effect. If the liquid in the tank is disturbed or rendered turbulent for any reason whatever, the most it will tend to do is cause the circular float 21 to rotate around the wire, while remaining in contact with the wire, whereby the float can perform its above-described function without being in any way affected.

In practice, the circuit of FIG. 1 requires a further refinement because of a discontinuity which exists near the transducer, as will now be explained with reference to FIG. 4, which shows at 10' the top of a tank similar to tank 10 in FIG. 1, which in the case of a marine tanker is also usually part of the deck of the tanker. A trunk 24 is conventionally provided on top of the tank, and usually extends up from the tank for a distance of about three feet, and usually has a diameter of three or four feet. The transducer element 36 which is energized by line 4 as in FIG. 1, is mounted in an explosion-proof box 37 at the end of a rod 6' which is preferably a steel rod about one-half inch in diameter, which tapers at the other end down to the size of the wire 7 which it supplies with energy, the tapered connection providing in effect a sonic transformer, as is well known. However, the transition from the relatively thick rod to the thin wire, which is approximately $\frac{1}{16}$ inch in diameter, still provides a discontinuity which tends to send some wave reflections back along wire 4 when the transducer is excited, and since at this time the gate 9 is open, as previously explained, this could cause a false indication. To eliminate this possibility, an acoustic delay 34 is inserted in line 7 above the highest liquid level which is to be measured, the delay being of sufficient time duration so that any reflected pulses from the transition will have had time to die down, and an electrical delay 35 is inserted in the pulser output, so that the oscilloscope or other measuring device does not become effective until after any reflected pulses from the transition point have had time to die down. It is necessary to use a large diameter sonic element 6' because this must be supported by sealing packing as shown at points 38 and 39, where the rod 6' enters the tank. A large diameter rod can be constrained at its perimeter at points 38 and 39, while its central mass passes most of the sonic energy from the transducer; if a very thin diameter wire were used at this point, the necessary packing would exert too much damping effect on the sonic pulses, and seriously weaken the strength of the transmitted sonic signal along the wire. It must be kept in mind that the material within the tank may be highly inflammable, e.g., gasoline, and safety regulations require that a very good seal be maintained at points 38 and 39. A sonic delay unit 34 may conveniently be a drum 41 made of, or at least surfaced with a relatively soft material such as foam plastic and designed to gradually attenuate the signal to about half of its initial strength, which also has the effect of sufficiently attenuating any false sonic signals which may be produced by the discontinuity in the rod 6' or by its points of support 38 and 39, while still leaving ample signal strength from the transducer 36 to be detected as above described. The timing of the gate opening is so arranged, of course, that it will be responsive even to the signal of shortest duration, i.e., that received from the highest level of liquid in the tank.

It will be apparent that the embodiments shown are only exemplary and that various modifications can be made in construction and arrangement within the scope of my invention as defined in the appended claims.

I claim:

1. Means for measuring the distance of the surface of the liquid from a reference point above the liquid surface comprising
    (a) transducer means for producing mechanical pulses,
    (b) smooth single filament elongated sonic conductor means supplied with pulses by said transducer means for transmitting said pulses from the reference point to the surface of the liquid without producing significant reflections in said conductor means,
    (c) sonic reflection means at the liquid surface for reflecting an appreciable portion of the pulse energy back along said sonic conductor means,
    (d) and means for measuring the time of travel of said pulses from said reference point to said surface and back to said reference point as an indication of the distance of said surface from the reference point.

2. The invention according to claims 1, and sonic delay means between said transducer means and said reference point for delaying the time of arrival of said reflected pulses until any initial sonic reflections from the vicinity of said transducer means have died down.

3. The invention according to claim 2, said sonic delay means comprising a length of said sonic conductor between the transducer means and the reference point, said length being sufficient for said initial sonic reflections to have died down.

4. The invention according to claim 3, said length of sonic conductor being coiled into a compact element.

5. The invention according to claim 4, said coil being wound on a drum having a relatively soft surface.

6. The invention according to claim 1, said sonic reflection means comprising a float at the surface of the liquid said float having a sonic conductor element in contact with said elongated conductor means for providing a sonic discontinuity at said surface.

7. The invention according to claim 6, said elongated sonic conductor means being a metal wire, and said float-carried sonic means being a metal element spring-biased into sliding contact with said wire.

8. Means for measuring the distance of the surface of a liquid from a reference point above the liquid surface comprising
    (a) generator means for producing electric pulses,
    (b) sonic transducer means supplied by said generator means for transferring said electric pulses into corresponding mechanical pulses,
    (c) a smooth metal wire supplied with pulses by said transducer means for transmitting said pulses from a reference point above the surface of the liquid to the surface of the liquid without producing significant reflections in said wire,
    (d) float means at the surface of the liquid having a metallic element in sliding contact with said wire for reflecting an appreciable portion of the pulse energy back along said wire to said transducer means, whereby said reflected pulse signal energy is converted to electrical pulse energy,
    (e) electrical measuring means connected to said generator and to said transducer for measuring a function of the time interval between the initial electrical pulses supplied by said generator and the converted reflected electrical pulses supplied by said transducer as an indication of the distance from said reference point to said surface.

References Cited

UNITED STATES PATENTS 3,208,281   9/1965   Kalmus et al. _____ 73—290 XR

LOUIS R. PRINCE, *Primary Examiner.*

D. O. WOODIEL, *Assistant Examiner.*